United States Patent [19]
Saniez et al.

[11] Patent Number: 5,938,380
[45] Date of Patent: Aug. 17, 1999

[54] METHOD FOR ROTATIONALLY DRIVING GEAR MATERIAL WHEN HOB MACHINING IS PERFORMED, AND GEAR

[75] Inventors: Jean Michel Saniez; Makoto Nishiji, both of La Louviere, Belgium

[73] Assignee: Zexel Corporation, Tokyo, Japan

[21] Appl. No.: 08/948,582

[22] Filed: Oct. 10, 1997

[30] Foreign Application Priority Data

Jan. 9, 1997 [JP] Japan ................................. 9-013401

[51] Int. Cl.⁶ ................................................. B23F 17/00
[52] U.S. Cl. ............................... 409/12; 279/102; 409/62
[58] Field of Search .............................. 269/47; 279/102, 279/104; 409/10, 11, 12, 17, 51, 62

[56] References Cited

U.S. PATENT DOCUMENTS

| | | | |
|---|---|---|---|
| 1,905,277 | 4/1933 | Ewert | 409/12 |
| 3,053,118 | 9/1962 | Lavallee . | |
| 3,564,973 | 2/1971 | Archibald | 409/62 |
| 4,376,333 | 3/1983 | Kanamaru et al. . | |
| 5,074,025 | 12/1991 | Willard, III | 408/239 A |
| 5,135,810 | 8/1992 | Smith et al. . | |
| 5,192,172 | 3/1993 | Lunazzi | 409/11 |

FOREIGN PATENT DOCUMENTS

| | | |
|---|---|---|
| 661474 | 7/1995 | European Pat. Off. . |
| 461337 | 6/1928 | Germany . |
| 58-028435 | 2/1983 | Japan . |
| 58-045833 | 3/1983 | Japan . |
| 6-502713 | 3/1994 | Japan . |

*Primary Examiner*—Daniel W. Howell

[57] ABSTRACT

In order to rotationally drive a gear material (3) when the gear material (3) is gear machined using a hob (not shown), a drive hole (34) having a circular configuration in section and extending on an axis L of the gear material (3) is formed in an end face (3e) of the gear material (3) and a shaft member (4) having a polygonal configuration is employed. The distance from an axis of this shaft body (4) to each angular portion (4a) is larger than the radius of the drive hole (34). The distance from the axis of the shaft member (4) to each side portion (4b) of the shaft member (4) is smaller than the radius of the drive hole (34). The shaft member (4) is fitted, under pressure, in the drive hole (34) and the gear member (3) is rotationally driven through this shaft member (4).

3 Claims, 2 Drawing Sheets

METHOD FOR ROTATIONALLY DRIVING GEAR MATERIAL WHEN HOB MACHINING IS PERFORMED, AND GEAR

BACKGROUND OF THE INVENTION

This invention relates to a method for rotationally driving a gear material when the gear material is cut using a hob, and a gear thus hob machined.

As a method for rotationally driving a gear material when the gear material is gear cut machined using a hob, there has heretofore been employed a method in which a carrier is fixedly bolted to the outer periphery of a gear material so that the gear material is rotationally driven through the carrier, or a method in which a plurality of wedge-shaped projections are formed on an end face of a drive shaft of a gear hobbing machine in such a manner as to extend radially with respect to an axis thereof so that a rotational force of the drive shaft is transmitted to the gear material through the projections which are caused to bite into the end face of the gear material, for example.

In the first-mentioned method, the transmission of a rotational force between the carrier and the gear material is performed by only friction between the gear material, and the carrier and the bolt under the effect of a tightening force of the bolt. Therefore, it is difficult to transmit a large rotational driving force to the gear material. For this reason, a heavy cutting using a hob is difficult to perform and a gear cut machining cannot be performed efficiently.

On the other hand, in the second-mentioned method, a large rotational force can be transmitted to the gear material because the projections are caused to bite into the gear material. However, other problems are encountered in that recesses are left on the end face of the gear material as a trace of the projections bitten into the end face, and that the peripheral area of the recesses is swollen. For this reason, it is necessary to remove the swollen area when the gear is of the type that the end face of the gear is used as in a planet gear of a differential gear assembly described in Patent National Publication (Tokuhyo) No. 502713/1994, for example. As a consequence, the number of process is increased to that extent, thus resulting in decrease of gear manufacturing efficiency. Moreover, even if the swollen area is removed, the recesses are left as they are. To remove those recesses, a great number of processes are required. As a consequence, gear manufacturing efficiency is further decreased.

SUMMARY OF THE INVENTION

It is, therefore, a general object of the present invention to provide a method for rotationally driving a gear material when a hob machining is performed and a gear, in which the above-mentioned problems inherent in the prior art can be obviated.

From one aspect of the present invention, there is provided a method for rotationally driving a gear material when an outer peripheral surface of the gear material is gear machined using a hob, wherein a method for rotationally driving a gear material when a hob machining is performed, comprising forming a drive hole in one end face of the gear material in such a manner as to extend on an axis of the gear material, fitting, under pressure, a shaft member having a non-circular configuration in section in the drive hole in such a manner as to plastically deform an inner peripheral surface of the drive hole, and rotationally driving the gear material through the shaft member.

From another aspect of the present invention, there is also provided a gear comprising a drive hole formed in one end face of a gear material, the drive hole having a circular configuration in section and extending on an axis of a gear material, and a concave groove formed in an inner peripheral surface of the drive hole, the concave groove being formed by plastically deforming the inner peripheral surface of the drive hole with angular portions of a shaft member having a polygonal configuration in section and fitted, under pressure, in the drive hole, the gear being manufactured by gear machining the gear material using a hob while rotationally driving the gear material through the shaft member fitted, under pressure, in the drive hole.

DETAILED DESCRIPTION OF THE INVENTION

Figure 1:
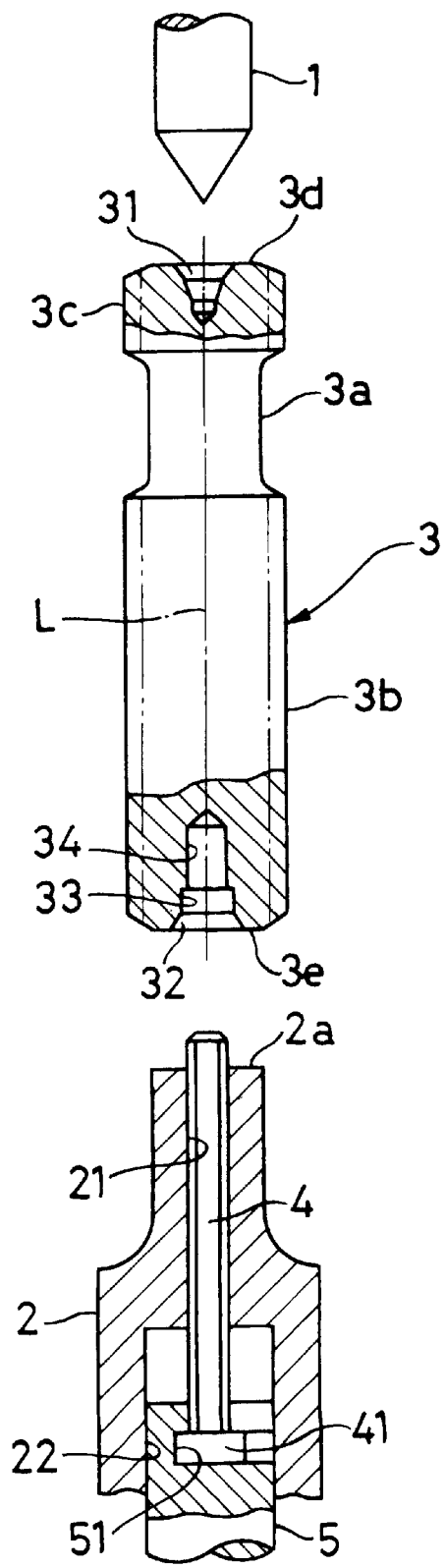
FIG. 1 is a schematic view showing a construction of a center and a drive shaft of a gear hobbing machine, and a gear material incorporated with the present invention.

One embodiment of the present invention will be described hereinafter with reference to FIGS. 1 through 4. In FIG. 1, there are illustrated a center 1 and a drive shaft 2 of a gear hobbing machine, and a gear material 3, according to the present invention.

First, the gear material 3 is described. This gear material 3 is used as a raw material of a planet gear of a differential gear assembly described in the previously mentioned Publication, for example. Enlarged diameter portions 3b and 3c are formed respectively on one and the other end portions of the gear material 3 with a neck portion 3a disposed therebetween. The enlarged diameter portions 3b and 3c are the same in outside diameter but different in length. Gear portions, which are all the same excepting the length thereof, are formed respectively on the enlarged diameter portions 3b and 3c. A gear bottom circle of the gear portion is indicated by an imaginary line. The diameter of this circle is slightly larger than the outside diameter of the neck portion 3a.

A center hole 31 is formed in one end face 3d of the gear material 3 such that the axis of the center hole 31 is in alignment with an axis L of the gear material 3. A tapered hole 32, a release hole 33 and a drive hole 34 are formed in the other end face 3e of the gear material 3 in order towards the first-mentioned end side. Those holes 32, 33 and 34 each have a circular configuration in section, and the axes of them are in alignment with the axis L. The tapered hole 32 is decreasingly tapered towards the first-mentioned end side. The inside diameter of a distal end portion of the tapered hole 32 is the same as the inside diameter of the release hole 33. The inside diameter of the release hole 33 is slightly larger than the inside diameter of the drive hole 34.

The gear hobbing machine is described next. When a gear cutting is performed, the center 1 is inserted into the center hole 31 to rotatably support the first-mentioned end portion of the gear material 3. The center 1 is caused to move towards and away from the drive shaft 2 by a moving mechanism (not shown).

On the other hand, the drive shaft 2 is aligned with an axis of the center 1 and rotationally driven by a rotational drive mechanism not shown. A guide hole 21 and a slide hole 22 having a larger diameter than the guide hole 21 are formed within the drive shaft 2 in order, inwardly from a distal end face 2a opposing the center 1. Those holes 21 and 22 each have a circular configuration in section and arranged on the axis of the drive shaft 2.

The shaft member 4 is inserted into the guide hole 21 for rotation relative to each other. One end portion of the shaft member 4 projects outside from the guide hole 21. The projecting length of the shaft member 4 is equal to or slightly shorter than the distance from the end face 3e of the gear material 3 to the innermost side of the release hole 33. The other end portion of the shaft member 4 is inserted into the slide hole 22 and formed with an engagement portion 41.

A push rod 5 is unrotatably and slidably inserted into the drive hole 22 and caused to move axially by a cylinder mechanism (not shown) or the like. An engagement recess 51 is formed in a distal end portion of the push rod 5. The engagement portion 41 of the shaft member 4 comes into engagement with this engagement recess 51, so that the push rod 5 and the shaft member 4 are integrally, namely, relatively unmovably and relatively rotatably connected together. Owing to this arrangement, the shaft member 4 is rotationally driven by the drive shaft 2 through the push rod 5. Of course, it may be arranged such that the shaft member 4 is unrotatably provided on the drive shaft 2 so that the shaft member 4 is rotationally driven directly by the drive shaft 2. In that case, the shaft member 4 and the push rod 5 may be relatively rotatably connected together.

Figure 3:
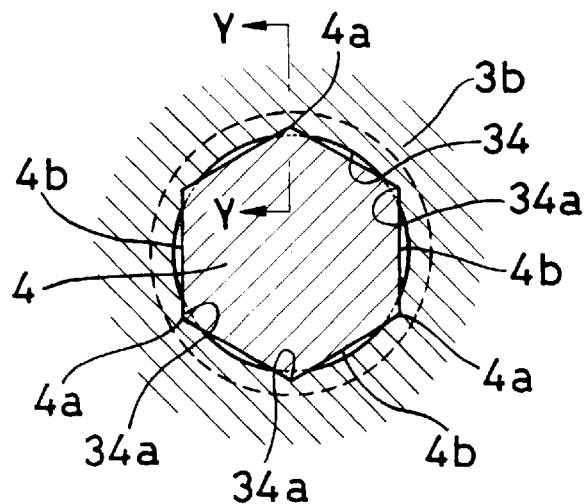
FIG. 3 is an enlarged sectional view taken on line X—X of FIG. 2.

The shaft member 4 is made of harder metal than metal of which the gear material 3 is made. As shown in FIG. 3, the shaft member 4 has a hexagonal configuration in section. The distance from the axis of the shaft member 4 to each side of the hexagonal shaft member 4 is smaller than the radius of the drive hole 3. On the other hand, the distance from the axis of the shaft member 4 to each angular portion is larger than the radius of the drive hole 34. Therefore, when the shaft member 4 is inserted into the drive hole 34, each angular portion is caused to bite into the inner peripheral surface of the drive hole 34 to plastically deform the inner peripheral surface. By doing so, the shaft member 4 and the gear material 3 are relatively unrotatably connected together. The distance from the axis of the shaft member 4 to each angular portion is smaller than the radius of the release hole 33.

For hob cut machining the gear material using a gear hobbing machine, first, the gear material 3 is aligned in axis with the center 1, and then, the center 1 is inserted into the center hole 31 of the gear material 3. Then, the center 1 is moved towards the drive shaft 2 side together with the gear material 3 such that the end face 3e of the gear material 3 contacts the distal end face 2a of the drive shaft 2. At that time, in order to prevent the gear material 3 from moving upwardly and downwardly and the center from displacing during machining, the end face 3e of the gear material 3 is caused to contact the distal end face 2a of the drive shaft 2 under a predetermined amount of pressure. In the pressure contacting state of the gear material 3 with the drive shaft 2, an outer end portion of the shaft member 4 projecting from the drive shaft 2 pierces through the tapered hole 32 and enters the interior of the release hole 33.

Figure 2:
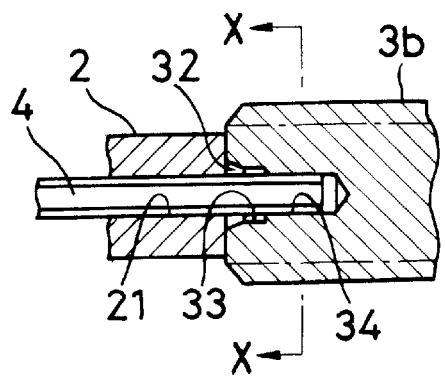
FIG. 2 is a sectional view showing a shaft member fitted, under pressure, into a drive hole formed in the gear material.

Thereafter, the shaft member 4 is caused to fit, under pressure, into the drive hole 34 by the push rod 5 (see FIG. 2). By doing so, each angular portion of the shaft member 4 bites into the inner peripheral surface of the drive hole 3 such that the inner peripheral surface of the drive hole 3 is plastically deformed. As a consequence, the gear material 3 is unrotatably connected to the shaft member 4. Therefore, when the drive shaft 2 is rotated, the gear material 3 is rotationally driven through the shaft member 4. Then, while rotationally driving the gear material 3, the enlarged diameter portions 3b and 3c are gear cut using a hob (not shown). Since the gear cutting using a hob is known, description thereof is omitted.

When the hob cutting is completed, the push rod 5 is retracted (downwardly in FIG. 1) to withdraw the shaft member 4 from the drive hole 34. Thereafter, the center 1 is retracted back to the original position and a gear obtained by gear cutting the gear material 3 is removed from the gear hobbing machine. Traces of the plastically deformed portion caused by each angular portion of the shaft member 4 are left on the inner peripheral surface of the drive hole 34 of the gear thus obtained.

As described in the foregoing, according to a driving method of the present invention, the shaft member 4 having a hexagonal configuration in section is fitted, under pressure, into the drive hole 34 of the gear material 3 so that the inner peripheral surface of the drive hole 34 is plastically deformed. And by doing so, the gear material 3 and the shaft member 4 are unrotatably connected together. Accordingly, the gear material 3 and the shaft member 4 are not relatively rotated. Thus, a large rotational force can be transmitted to the gear material 3. As a consequence, it becomes possible to perform a heavy cutting using a hob and the gear cutting performance can be enhanced.

Further, since the shaft member 4 is fitted, under pressure, into the drive hole 34 formed within the gear material 3, traces of plastically deformed portion caused by pressure fitting of the shaft member 4 do not appear to the end face 3e or other outer surfaces of the gear material 3. In the embodiment mentioned above, the traces of the plastically deformed portion caused by biting of each angular portion of the shaft member 4 into the inner peripheral surface of the drive shaft 34 appear as protrusions (not shown) on the inner peripheral surface of the drive hole 34 opposing each side portion of the shaft member 4 but do not appear outside. Therefore, no post machining is required. This makes it possible to enhance the manufacturing performance of the gear.

Figure 4:
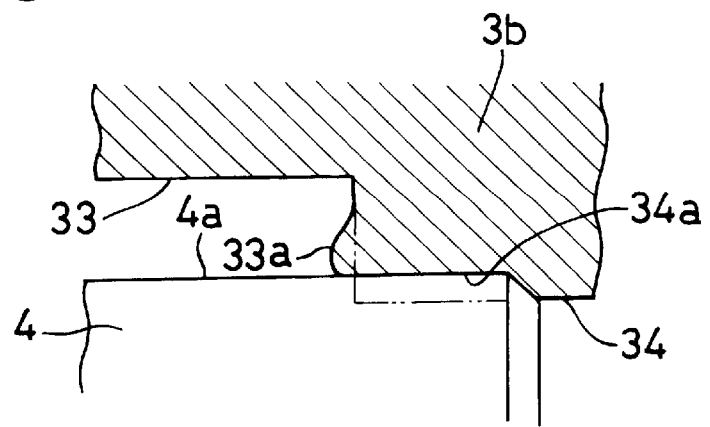
FIG. 4 is an enlarged sectional view taken on line Y—Y of FIG. 3.

In order to transmit a large rotational force to the gear material 3, it is necessary that each angular portion bits greatly into the inner surface of the drive hole 34. However, when each angular portion of the shaft member 4 is caused to bite greatly into the inner peripheral surface of the drive hole 34, the plastically deformed portion of the inner surface of the drive hole 34 sometimes appears as a protrusion 33a on a bottom surface of the release hole 33, as shown in FIG. 4. For this reason, if it is designed such that the drive hole 34 is opened directly to the end face 3e of the drive hole 34, or the drive hole 34 is connected directly to the tapered hole 32, protrusions like the afore-mentioned protrusions 33a cause the inner peripheral surface of the tapered hole 32 to be swollen. As a consequence, it becomes necessary to remove the protrusions from the end face 3e or the tapered hole 32 after the end of gear cutting because when the tapered hole 32 is used for measuring accuracy of the gear portion, such swollen portion will affect adversely to the accuracy of measurement.

In the above embodiment, however, since the release hole 33 having a larger diameter than the drive hole 34 is formed on the opening portion side of the drive hole 34, traces of the plastically deformed portion of the inner peripheral surface of the drive hole 34 merely appear on the bottom surface of the release hole 33 as protrusions 33a and the protrusions 33a do not cause the end face 3e or the inner peripheral surface of the tapered hole 32 to be swollen. Therefore, it is no more required to machine the end face 3e and the tapered hole 32.

It should be noted that the present invention is not limited to the above embodiment and that many modifications can be made in accordance with necessity.

For example, in the above embodiment, although the shaft member 4 has a hexagonal configuration in section, it may have any other non-circular configuration such as, for example, an octagonal configuration and an elliptical configuration.

What is claimed is:

1. A method for rotationally driving a gear material when an outer peripheral surface of said gear material is gear machined using a hob, wherein a method for rotationally driving a gear material when a hob machining is performed, comprising forming a drive hole in one end face of said gear material in such a manner as to extend on an axis of said gear material, fitting, under pressure, a shaft member having a non-circular configuration in section in said drive hole in such a manner as to plastically deform an inner peripheral surface of said drive hole, and rotationally driving said gear material through said shaft member.

2. A method for rotationally driving a gear material when a hob machining is performed as defined in claim 1, wherein said drive hole has a circular configuration in section, said shaft member has a polygonal configuration, a distance from an axis of said shaft member to each angular portion of said shaft member is larger than a radius of said drive hole, and a distance from said axis of said shaft member to each side portion of said shaft member is smaller than the radius of said drive hole.

3. A method for rotationally driving a gear material when a hob machining is performed as defined in claim 1 or 2, wherein said drive hole includes a release hole on one end thereof on the side of one end face of said gear material, said release hole having an inside diameter larger than that of said drive hole.

* * * * *